May 19, 1953 E. W. D'ARCY 2,639,146
FILM GUIDE ROLLER FOR MOTION-PICTURE
PROJECTING MACHINES
Filed Sept. 9, 1950
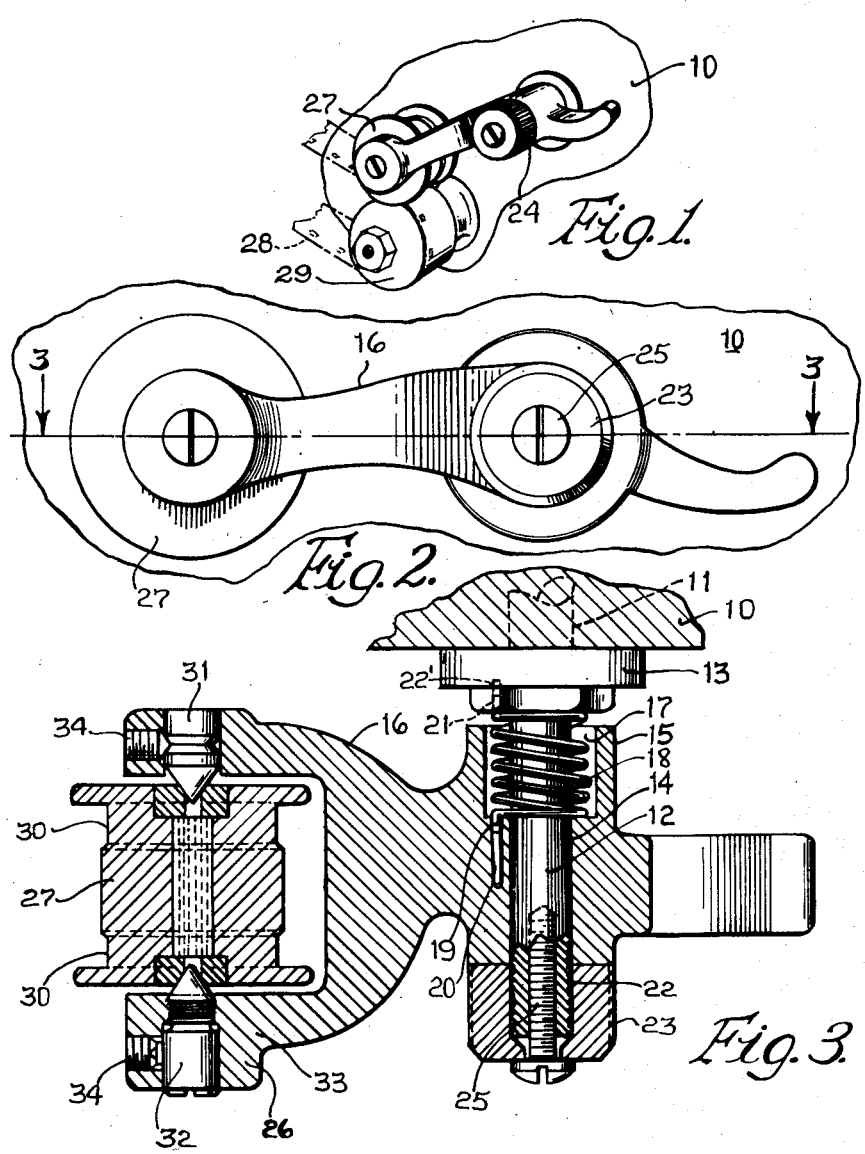
INVENTOR:
Ellis Wellington D'Arcy
BY
Clarence E. Threedy
His Attorney.

Patented May 19, 1953

2,639,146

UNITED STATES PATENT OFFICE 2,639,146

FILM GUIDE ROLLER FOR MOTION-PICTURE PROJECTING MACHINES

Ellis Wellington D'Arcy, Chicago, Ill., assignor to De Vry Corporation, Chicago, Ill., a corporation of Illinois Application September 9, 1950, Serial No. 184,030

2 Claims. (Cl. 271—2.3)

This invention relates to certain new and useful improvements in film guide rollers for motion picture projecting machines and has for its principal object the provision of an improved construction of this character which will be highly efficient in use and economical in manufacture.

It is also an object of the invention to provide a mounting for a film roller whereby the roller can be adjusted either while the projecting apparatus is inoperative or during the operation thereof so that the roller may be properly biased upon the film web and properly positioned with respect to such web to effect and permit a proper and smooth running of the film over the sound drum of the apparatus.

Another and equally important object of the invention is to provide an arrangement for the above purposes which comprises relatively few parts thereby permitting easy assembly with a minimum amount of labor.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of my improved film guide roller showing the same in position with respect to a film web and the sound drum of a motion picture apparatus;

Fig. 2 is a side elevational view of the invention; and

Fig. 3 is a sectional detail view taken substantially on line 3—3 of Fig. 2.

The several objects of my invention are accomplished by the preferred form of construction shown in the accompanying drawing wherein a wall 10 of the motion picture apparatus is fragmentarily illustrated. In this wall 10 is mounted as at 11 the end portion of a stud shaft 12 having mounted thereon a stop collar or nut 13. This stud shaft 12 projects through an opening 14 formed in a bearing sleeve 15 formed integrally as a part of a bracket arm 16.

This opening 14 communicates with an enlarged counterbore 17 within which is arranged an expansion spring 18. This expansion spring 18 embraces that portion of the shaft 12 passing through the counterbore 17 and has one end portion 19 frictionally projected in a socket 20 formed in the bearing sleeve 15. The opposite end portion 21 of the spring 18 is frictionally projected in a socket 22' formed in the stop nut 13.

The stud shaft 12 provides an outer threaded end portion 22. Threaded on this end portion 22 is a nut 23 preferably having its cylindrical surface knurled as at 24 to provide gripping surfaces for the fingers whereby the nut may be grasped by the fingers and threaded upon the threaded portion 22 of the stud shaft 12 to move the bearing sleeve 15 longitudinally with respect to such shaft. This bearing sleeve 15 is normally projected away from the stop collar 13 by the spring 18. To lock the adjustment nut 23 in an adjusted position there is threaded into the threaded portion 22 of the shaft 12 a set screw 25. By this set screw 25 the nut 23 is locked in an adjusted position upon the shaft.

The bracket arm 16 provides a yoke 26 within which is rotatably supported the roller 27 which engages the film web 28 for the purposes of guiding the film web over the sound drum 29 and properly tensioning the same with respect thereto. This roller 27 is of a standard construction providing opposite end relieved cylindrical surfaces 30 to reduce the friction of the roller upon the film web. The roller is adjustably mounted within the yoke 26 by pivot pins 31 and 32, the pin 32 being adjustable relative to the finger 33 of the yoke. These pins are locked in an adjusted position by set screws 34.

From the foregoing descripion, it is clear that the spring 18 performs a two-fold function. It serves to properly bias the roller 27 so as to impose the right amount of tension of the film web upon the sound drum during the function of the roller in guiding such web around the sound drum. It also provides the function of cooperating with the adjustment nut to properly locate the roller with respect to the film web. These two functions are accomplished by a structure which comprises relatively few parts and by reason thereof may be manufactured at an economical cost.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In a combination comprising a stud shaft, a yoke having an integrally formed bearing sleeve and an opening through the sleeve through which the stud shaft is projected, said sleeve having an enlarged counterbore communicating with the opening, a stop nut mounted on the stud shaft adjacent said counterbore, an expansion spring embracing said stud shaft and arranged in the counterbore and having one end portion connected to the stop nut and an opposite end portion connected to the bearing sleeve, a lock nut threaded on the outer end portion of the stud shaft and adapted to bear against the bearing sleeve for shifting the sleeve longitudinally with respect to the stud shaft against the action of the expansion spring, a roller carried by said yoke, said spring acting on said yoke to bias said roller with respect to said stud shaft.

2. In a combination comprising a stud shaft, a yoke having an integrally formed bearing sleeve and an opening through the sleeve through which the stud shaft is projected, said sleeve having an enlarged counterbore communicating with the opening, a stop nut mounted on the stud shaft adjacent said counterbore, an expansion spring embracing said stud shaft and arranged in the counterbore and having one end portion connected to the stop nut and an opposite end portion connected to the bearing sleeve, an adjustment nut threaded on the outer end portion of the stud shaft and adapted to bear against the bearing sleeve for shifting the sleeve longitudinally with respect to the stud shaft against the action of the expansion spring, a roller carried by said yoke, said spring acting on said yoke to bias said roller with respect to said stud shaft, and means for locking said adjustment nut in an adjusted position upon said stud shaft, said last named means including a set screw threaded into the stud shaft and bearing on said adjustment nut.

ELLIS WELLINGTON D'ARCY.

References Cited in the file of this patent

UNITED STATES PATENTS

| Number | Name | Date |
|---|---|---|
| 1,682,333 | Hart | Aug. 28, 1928 |
| 2,073,224 | Ross | Mar. 9, 1937 |
| 2,258,759 | Heacock | Oct. 14, 1941 |